Patented May 5, 1931

1,804,045

UNITED STATES PATENT OFFICE

CLEMENS ZÖLLNER, OF BERLIN-CHARLOTTENBURG, GERMANY, ASSIGNOR TO SCHERING-KOHLBAUM AKTIENGESELLSCHAFT, OF BERLIN, GERMANY

PRODUCTION OF QUINOLINE DERIVATIVES

No Drawing. Application filed January 11, 1928, Serial No. 246,086, and in Germany January 14, 1927.

My invention refers to new products, being derivatives of quinoline, and to the process of making same.

Blaise and Maire (Bull. Soc. Chim. 1908, 4th Series, Vol. 3, page 662) have shown that alkyl-β-halogen ethyl ketones will react with aniline in an anhydrous medium under formation of a quinoline nucleus.

I have found that quinoline derivatives can be obtained more smoothly and in better yield if alkyl-β-halogen ethyl ketones, prepared for instance by causing ethylene to act on an acyl halogenide in the presence of a catalyst and treating the reaction product with water, as described in an application for patent of the United States Serial No. 240,612 executed on November 29, 1927, by Walter Schoeller and myself, are subjected to condensation with aniline or its derivatives in a watery acid solution in the presence of an oxidizing agent, for instance nitrobenzene or arsenic acid. I have found that the reaction will take place also in neutral and in an alkaline solution and even without the addition of an oxidizing agent as follows:

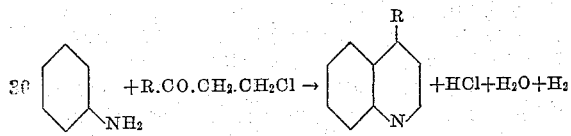

Example 1.—4-methyl quinoline (lepidine)

93 parts by weight methyl-β-chloroethyl ketone are mixed with 80 parts aniline, 350 parts concentrated hydrochloric acid or the corresponding quantity of a 40 per cent sulfuric acid and 70 parts nitrobenzene. The mixture is heated for some hours on a water bath, whereupon the nitrobenzene is removed by extraction with ether or by distillation with steam. From the resulting liquid, upon it being rendered alkaline, there is extracted by ether a basic mixture, from which after distillation of the ether and dissolution with a small quantity of alcohol an alcoholic solution of picric acid will precipitate a large quantity of lepidine picrate. In order to recover the free base, the solution is rendered alkaline and lepidine is driven over with steam. The 4-methyl quinoline which is obtained has the formula

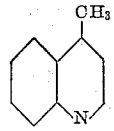

Example 2.—6-methoxy lepidine

Equal parts by weight of p-anisidine, nitrobenzene, methyl chlorethyl ketone and the five-fold quantity of concentrated hydrochloric acid are mixed and the mixture heated for some time on the water bath to render the reaction complete. The product of reaction is treated further as described with reference to Example 1. The separation of the bases in the mixture can also be effected in such manner that the anisidine, which has not been consumed in the reaction, is changed by acetylizing or diazotizing and boiling, whereupon p-methoxy lepidine can be separated in the usual manner.

Instead of nitrobenzene I can also use arsenic acid.

The p-methoxy lepidine has the formula

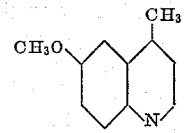

Example 3.—8-methoxy lepidine

This compound is obtained by proceeding as described with reference to Example 2, however replacing the p-anisidine by o-anisidine. The 8-methoxy lepidine, which was hitherto unknown, is an almost white crystallized compound melting at 83° C. and boiling under 11 mms. mercury pressure at 170° C. The picrate melts at 184° C., being dark colored at this temperature. The 8-methoxy lepidine has the formula

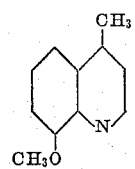

Example 4.—6-ethoxy lepidine

This compound is obtained from p-phenetidine in the manner described with reference to Examples 2 and 3. It has the formula

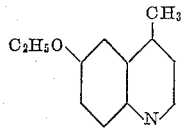

Example 5.—6-nitro lepidine 58 parts by weight of p-nitroaniline, 175 parts concentrated hydrochloric acid, 35 parts nitrobenzene and 46 parts methyl-β-chloroethyl ketone are heated on the water bath during some hours. After expulsion of the nitrobenzene by means of steam the liquid is rendered alkaline and the precipitate, which has formed, is removed by suction. After extraction with hot alcohol the alcoholic solution is treated with alcoholic picric acid for the recovery of the picrate. The picrate is decomposed with concentrated hydrochloric acid and water, the picric acid is removed by extraction with ether, and the base is recovered from the hydrochloric acid solution, after the same has been rendered alkaline, by extraction with ether. The hitherto unknown 6-nitro lepidine which results in this treatment is a crystallized compound which, on being repeatedly recrystallized from alcohol, melts at 137° C. It has the formula

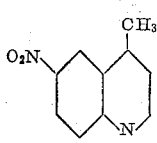

Example 6.—6-chloro lepidine

This compound is obtained by treating p-chloroaniline as described with reference to Examples 2 and 3. The picrate melts at 222° C. The hitherto unknown 6-chloro lepidine is a crystallized compound melting at 71/72° C. and being readily soluble in the usual organic solvents. It has the formula

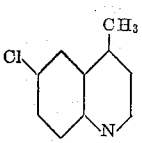

Example 7.—Lepidine-8-carboxylic acid 70 parts by weight of anthranilic acid ester, 175 parts concentrated hydrochloric acid, 35 parts nitrobenzene and 50 parts methyl-β-chloroethyl ketone are heated during 4–5 hours on the water bath. The nitrobenzene is removed from the reaction liquid by extraction with ether and the acid liquid is boiled during three hours under the reflux condenser in order to saponify the esters present therein. Thereupon the liquid is acidified by means of a solution of sodium acetate, and such oil, as may have separated out is removed by shaking with ether. In the watery part of the liquid needles segregate out, which are obtained by sucking the liquid off and form lepidine-8-carboxylic acid. This compound is soluble in boiling water and alcohol, cold acetone and caustic alkali, insoluble in ether and, on being repeatedy recrystallized from water, melts at 186–187° C. It has the formula

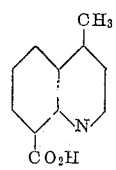

Example 8

52 parts by weight anisidine, 100 parts alcohol (96 per cent), 35 parts nitrobenzene, 50 parts concentrated caustic soda solution and 46 parts methyl-β-chloro ethyl ketone are stirred some time at ordinary temperature, whereupon the mixture is heated during one hour on the water bath and the alcohol is driven over. To the liquid is added hydrochloric acid to obtain an acid reaction with congo, whereupon the nitrobenzene is driven over with steam, the filtered residue is rendered alkaline and is extracted with ether. The ether now contains a mixture of bases from which the picrate of p-methoxy lepidine can be recovered as described above. It has the formula

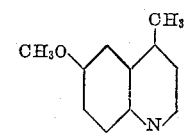

Example 9—4-ethyl quinoline

This compound can be obtained from ethyl-β-chloroethyl ketone and aniline in a manner analogous to the one described with reference to lepidine. Its picrate melts at 195° C., being dark colored at that temperature. The base itself is oily, has a smell resembling that of quinoline, and is volatile with steam. It has the formula

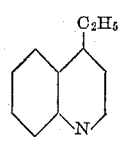

In the claims affixed to this specification the term "alkyl quinolines" is intended to include also derivatives of the alkyl quinoline, the benzene nucleus of which includes substituents, for instance the chlorine atom, the nitro-, carboxyl-, or methoxy-group, and in consequence thereof an "aniline" is intended to include also the derivatives thereof, such as for instance chloroaniline, nitroaniline, anthranilic acid or esters of amino phenol.

Various changes may be made in the de-

I claim:—

1. The process of producing 4-alkyl quinolines having the formula

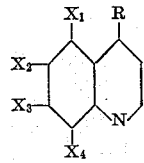

wherein R is an alkyl, while $X_1$, $X_2$, $X_3$, $X_4$, are hydrogen atoms or any univalent substituents, comprising reacting with an alkyl-$\beta$-halogen ethyl ketone in watery solution on an aniline and isolating the resulting alkyl quinoline.

2. The process of producing 4-alkyl quinolines having the formula

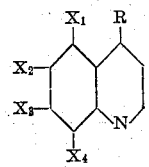

wherein R is an alkyl, while $X_1$, $X_2$, $X_3$, $X_4$, are hydrogen atoms or any univalent substituents, comprising reacting with an alkyl-$\beta$-halogen ethyl ketone in watery acid solution on an aniline and isolating the resulting alkyl quinoline.

3. The process of producing 4-alkyl quinolines having the formula

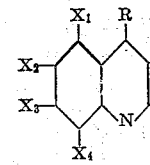

wherein R is an alkyl, while $X_1$, $X_2$, $X_3$, $X_4$ are hydrogen atoms or any univalent substituents, comprising reacting with an alkyl-$\beta$-halogen ethyl ketone in watery solution on an aniline in the presence of an oxidizing agent and isolating the resulting alkyl quinoline.

4. The process of producing 4-alkyl quinolines having the formula

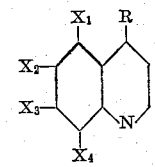

wherein R is an alkyl, while $X_1$, $X_2$, $X_3$, $X_4$ are hydrogen atoms or any univalent substituents, comprising reacting with an alkyl-$\beta$-halogen ethyl ketone in acid watery solution on an aniline in the presence of an oxidizing agent and isolating the resulting alkyl quinoline.

5. The process of producing 4-alkyl quinoline having the formula

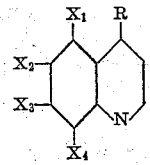

wherein R is an alkyl, while $X_1$, $X_2$, $X_3$, $X_4$ are hydrogen atoms or any univalent substituents, comprising reacting with an alkyl-$\beta$-halogen ethyl ketone in watery solution on an aniline in the presence of nitrobenzene and isolating the resulting alkyl quinoline.

6. The process of producing 4-alkyl quinolines having the formula

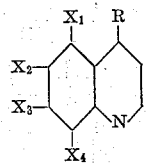

wherein R is an alkyl, while $X_1$, $X_2$, $X_3$, $X_4$, are hydrogen atoms or any univalent substituents, comprising reacting with an alkyl-$\beta$-halogen ethyl ketone in watery acid solution on an aniline in the presence of nitrobenzene and isolating the resulting alkyl quinoline.

7. The process of producing 6-alkoxy-4-alkyl quinolines having the formula

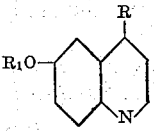

wherein R and $R_1$ are the same or different alkyl groups, comprising acting with an alkyl-$\beta$-halogen-ethyl ketone on an alkyl ester of amino phenol and isolating the resulting 6-alkoxy-4-alkyl quinoline.

8. The process of producing 6-methoxy lepidine having the formula

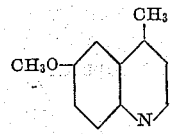

comprising acting with a methyl halogen ethyl ketone on p-anisidine and isolating the resulting 6-methoxy lepidine.

9. The process of producing 6-methoxy lepidine having the formula

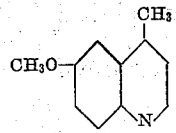

comprising acting with a methyl halogen ethyl ketone in watery solution on p-anisidine and isolating the resulting p-methoxy lepidine.

10. The process of producing 6-methoxy lepidine having the formula

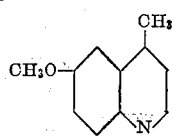

comprising acting with a methyl halogen ethyl ketone in watery acid solution on p-anisidine and isolating the resulting p-methoxy lepidine.

11. The process of producing 6-methoxy lepidine having the formula

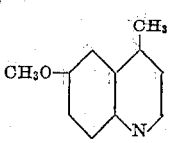

comprising acting with a methyl halogen ethyl ketone on p-anisidine in the presence of an oxidizing agent and isolating the resulting p-methoxy lepidine.

12. The process of producing 6-methoxy lepidine having the formula

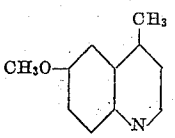

comprising acting with a methyl halogen ethyl ketone in p-anisidine in the presence of nitrobenzene and isolating the resulting p-methoxy lepidine.

13. The process of producing 6-methoxy lepidine having the formula

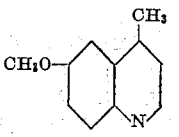

comprising acting with a methyl halogen ethyl ketone in watery solution on p-anisidine in the presence of nitrobenzene and isolating the resulting p-methoxy lepidine.

14. The process of producing 6-methoxy lepidine having the formula

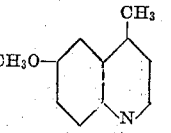

comprising acting with a methyl chloro ethyl ketone on p-anisidine and isolating the resulting 6-methoxy lepidine.

15. The process of producing 6-methoxy lepidine having the formula

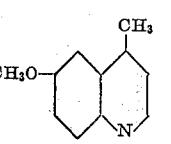

comprising acting with a methyl chloro ethyl ketone in watery solution on p-anisidine and isolating the resulting p-methoxy lepidine.

16. The process of producing 6-methoxy lepidine having the formula

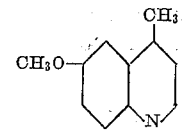

comprising acting with a methyl chloro ethyl ketone in watery acid solution on p-anisidine and isolating the resulting p-methoxy lepidine.

17. The process of producing 6-methoxy lepidine having the formula

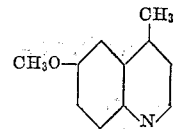

comprising acting with a methyl chloro ethyl ketone on p-anisidine in the presence of an oxidizing agent and isolating the resulting p-methoxy lepidine.

18. The process of producing 6-methoxy lepidine having the formula

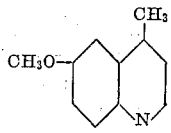

comprising acting with a methyl chloro ethyl ketone on p-anisidine in the presence of nitrobenzene and isolating the resulting p-methoxy lepidine.

19. The process of producing 6-methoxy lepidine having the formula

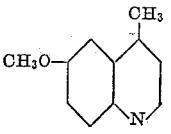

comprising acting with a methyl chloro ethyl ketone in watery solution on p-anisidine in the presence of nitrobenzene and isolating the resulting p-methoxy lepidine.

In testimony whereof I affix my signature.

CLEMENS ZÖLLNER.